(12) United States Patent
Lin et al.

(10) Patent No.: US 7,830,821 B2
(45) Date of Patent: Nov. 9, 2010

(54) METHOD OF CONNECTING AND SHARING RESOURCES OF NETWORK TERMINAL DEVICES OF TWO PRIVATE NETWORKS VIA USER AGENTS

(75) Inventors: Yi-Hsiang Lin, Taipei (TW); You-Hsin Yen, Taipei (TW); Hsun-Cheng Lin, Taipei (TW); Li-Ming Huang, Taipei (TW)

(73) Assignee: D-Link Corporation, Taipei (TW)

( * ) Notice: Subject to any disclaimer, the term of this patent is extended or adjusted under 35 U.S.C. 154(b) by 350 days.

(21) Appl. No.: 12/068,385

(22) Filed: Feb. 6, 2008

(65) Prior Publication Data

US 2009/0122722 A1 May 14, 2009

(30) Foreign Application Priority Data

Nov. 12, 2007 (TW) .............................. 96142652 A (51) Int. Cl.
*H04L 12/28* (2006.01)
(52) U.S. Cl. ........................................................ 370/254
(58) Field of Classification Search .................. 370/254
See application file for complete search history.

(56) References Cited

U.S. PATENT DOCUMENTS

| | | | |
|---|---|---|---|
| 2005/0094621 A1* | 5/2005 | Acharya et al. .............. 370/352 |
| 2005/0185612 A1* | 8/2005 | He .............................. 370/329 |
| 2006/0004924 A1* | 1/2006 | Trossen ....................... 709/228 |
| 2006/0037036 A1* | 2/2006 | Min et al. ....................... 725/1 |
| 2006/0123116 A1* | 6/2006 | Rahman et al. ............. 709/227 |
| 2006/0143295 A1* | 6/2006 | Costa-Requena et al. ... 709/227 |
| 2006/0245403 A1* | 11/2006 | Kumar ....................... 370/338 |
| 2007/0156719 A1* | 7/2007 | Upendran et al. ........... 707/100 |
| 2007/0201508 A1* | 8/2007 | Blackford et al. ........... 370/466 |
| 2009/0094684 A1* | 4/2009 | Chinnusamy et al. .......... 726/4 |

* cited by examiner

*Primary Examiner*—John Pezzlo
*Assistant Examiner*—Saad Hassan
(74) *Attorney, Agent, or Firm*—Bacon & Thomas, PLLC (57) ABSTRACT

A method of connecting and sharing resources of network terminal devices of two private networks via user agents is applied in a network system including at least two private networks and an Internet. Each private network includes at least two network terminal devices. At least one network terminal device installs a user agent, and each user agent is connected with the other network terminal device on a private network. Each network terminal device is connected to the Internet through a network connecting device. In the method, the network terminal device can be connected with other network terminal devices on the private network for accessing data, and a connection channel can be established between the network terminal devices on the public network and another private network, and the network terminal devices on the other private network can share the services provided by other network terminal devices on the private network.

12 Claims, 5 Drawing Sheets

METHOD OF CONNECTING AND SHARING RESOURCES OF NETWORK TERMINAL DEVICES OF TWO PRIVATE NETWORKS VIA USER AGENTS

FIELD OF THE INVENTION

The present invention relates to a user agent (UA), and more particularly to user agents installed in two network terminal devices of two private networks respectively for enabling the other network terminal devices of the two private networks to establish a connection channel through the respective user agents in the private networks to execute a data access via the Internet.

BACKGROUND OF THE INVENTION

In recent years, computer and network technologies are developed rapidly, and various computers, electric appliances and network terminal devices (such as webcams, Internet phones, web disks, and network printers, etc) and digital electronic devices come with a good quality, a low price, and a thin, light, short and compact design, and thus the aforementioned products are used extensively in our daily life and work. For instance, present household digital electronic devices such as digital cameras, camcorders, DVD-players, set-top-boxes, MP3-players and computers can store a large volume of digital data, but their connecting interface and file format vary with each model and brand, and thus the digital data are not compatible with each other, and even cannot be read by some devices. In view of the foregoing issue, Microsoft extends a technical concept of plug and play to be applied in the environment of a standalone system to the network environment and defines a universal plug and play (UPnP) protocol, and the UPnP protocol focuses on digital home to define a device protocol primarily for facilitating the installation, operation and management of each model of the digital electronic devices, so that users simply plug a network cable into the device and turn on the power, and the operation of the UPnP protocol will complete all necessary setups, and dynamically add a private network, obtain an IP address, declare a user name, provide a required function and check the existence and function of other devices in the private network. Further the UPnP protocol is employed, such that the device can be separated from a private network automatically and stably without causing problems. Since the UPnP protocol does not rely on any specific operating system, programming language or physical medium, therefore the UPnP protocol allows each device in a small private network such as a home network, a small business network, and a network in a business-living building to be used by another computer, application program or smart device, and to become a terminal device of another computer, application program or smart device. Thus, the UPnP protocol has become an important framework, protocol and interface standard used by various different types of computers, network terminal devices, application programs or smart devices.

In general, the UPnP protocol is the most basic protocol adopted by a device which can be a physical device or a logical device including a control point and a controlled device that provides services, wherein the control point is a controller capable of controlling several controlled devices simultaneously, and searching for controlled devices and service descriptions, issuing service commands, inquiring service status and receiving events, and allowing users to execute a program installed in the controlled device (such as CD player).

The UPnP protocol employs several standard protocols such as IP, TCP, UDP, HTTP and XML used extensively in the Internet as communication protocols between devices, and the standard protocols are helpful to implement the controllability between different branded devices. Since the standard protocols have been used extensively in many existing devices, almost no setup or adjustment is needed for the devices to operate in the existing network environment through the UPnP protocol. In general, when a UPnP protocol device is connected to a private network, the device obtains an IP address through a DHCP server, and its control point can use a simple service discovery protocol (SSDP) to actively search for another device of the private network, or another equipment of the private network that can notice a control point through broadcasting, so that the control point can obtain a uniform resource locator (URL) of the other device, and obtain the detailed information of the other device according to the URL. After the information and service description of the other device are obtained, the control point issues a service command to the other device to obtained the desired services.

With the introduction of a new generation operating system Windows Vista, Microsoft develops a Windows rally technology to improve the interconnectivity of network terminal devices, so that any network terminal device in the private network and its installation and connection can be discovered easily by each other for achieving a connection with other network terminal devices to share the functions provided by other network terminal devices. Such arrangement complies with the urgent need for an instant plug-in of the present handheld digital electronic devices. Thus, the Windows rally technology can build a bridge for a flexible interconnection between digital electronic devices. To achieve a simple and easy connection of the digital electronic devices and a uniform communication, Microsoft, Intel, W3C, and other major international companies jointly establish a new standard network service (Device Profile for Web Services, DPWS) and related Web Services (WS) protocol systems for the devices, so as to make the connection of the following types of digital electronic devices simpler and easier as well as the interactive communication safer and more reliable:

(1) Computer and I/O device, such as personal computer, keyboard, game equipment, scanner, printer and projector;

(2) Storage device, such as hard disk, DVD, SD and CD;

(3) Network connecting device, such as router, gateway, and AP;

(4) Media device, such as MP3, stereo, and DVR; and (5) Home device, such as telephone, smart lamp, and air-conditioner.

In the technical framework of the Windows Rally, a plug and play extensions (PnP-X) protocol is provided for the aforementioned digital electronic devices installed to a computer, so that the electronic devices can discover each other automatically. The digital electronic devices can be used in a way similar to an insertion of a USB digital electronic device, and an application program interface (API) is built in the Windows Vista operating system to provide some new user programming interfaces to support the Windows Rally technology and implement more clients, wherein a function discovery (FD) API can support the simple service discovery protocol (SSDP) and WS-discovery protocol. The FD implemented on the Windows Vista of DPWS comprises a web services discovery (WS-D) and a UPnP AV user programming interface, and the WS-D primarily focuses on the network terminal devices on the Internet to provide corporate application solutions, and the UPnP AV primarily focuses on Audio/Video (AN) digital electronic devices on a home network.

If an electronic device with the installed Windows Vista is connected to a private network, the device will use the UPnP AV protocol to broadcast services to a control point. Similarly, if a control point is added into the private network, the control point will use the UPnP protocol to search for the related information of a desired device existed on the private network. If a control point has found a device, the control point still has little information about the device. To let the control point know more information about the device or communicate with the device, the control point loads the URL from the device via a browser, and obtains the description information such as a model name, a serial number, a manufacturer name and a brand in the URL message issued by the device. After a control point obtains the description and information of a device, the control point will send out a control instruction to the device.

From the description above, although the discovery protocol such as the aforementioned UPnP AV protocol and WS-Discovery protocol allows any of the network terminal devices in a private network to have the mechanisms of discovering, installing and connecting each other automatically and easily, and achieve a connection with other network terminal devices on the same private network to share services provided by other network terminal devices. Since many present private networks generally install a network address transfer (NAT) router at their outlets, a packet is issued from the boundary of the private network and the public network to the network terminal devices of the private network for converting the IP address, so that the network terminal devices in the private network can share an IP address for connecting to the Internet. In other words, if an IP data packet issued by a private network reaches a NAT router, the NAT is responsible to convert an internal IP address of a private network into a legal IP address of the public network. After an external transmitted data has reached the NAT router, the NAT converts the public network address into a private network address by checking the information in a mapping table stored in the NAT, and transfers the public network address to the internal receiving node. Since the IP address is a private address that cannot be recognized by a public network, a connection channel cannot be established between the network terminal devices of the two private networks to share the services provided by the corresponding network terminal device via the Internet.

Therefore, it is an important subject for manufacturers to design a user agent (UA) installed in a network terminal device, such that the network terminal device can be connected with other network terminal devices on the private network for accessing data, and a connection channel can be established between the network terminal devices of the public network and another private network, and the network terminal devices on the other private network can share the services provided by other network terminal devices on the private network.

SUMMARY OF THE INVENTION

In view of the problems and shortcomings of the prior art, the inventor of the present invention based on years of experience in the related industry to conduct extensive researches and experiments, and finally invented a method of using user agents installed in two network terminal devices of two private networks respectively for enabling the other network terminal devices of the two private networks to establish a connection channel through the respective user agents in the private networks to execute a data access via the Internet.

It is a primary objective of the present invention to provide the aforementioned method applied in a network system, and the network system comprises at least two private networks and an Internet, wherein each private network includes at least two network terminal devices (such as a computer with a network interface, a webcam, an Internet telephone, a web disk and a network printer), wherein at least one network terminal device installs a user agent, and each network terminal device is connected to the Internet through a network connecting device (such as a network switch). In the method, after the user agent of the first network terminal device on the first private network has received a discovery protocol (such as a UPnP AV protocol request and a WS-Discovery protocol) request transmitted from the second network terminal device on the first private network, the discovery protocol request is packaged into a session initiation protocol (SIP) packet and transmitted to the user agent of the third network terminal device on the second private network via the Internet. After the user agent of the third network terminal device has received the SIP packet, the discovery protocol request packaged in the SIP packet is transmitted to the fourth network terminal device on the second private network. After the user agent of the third network terminal device has received a response of discovery protocol returned by the fourth network terminal device, the response is packaged into another SIP packet and returned to the second network terminal device sequentially through the Internet and the user agent of the first network terminal device, so that the second and fourth network terminal devices can establish a connection channel between the two private networks through the user agents of the first and third network terminal devices respectively via the Internet. When the user agents of the first and third network terminal devices have received an access protocol request (or response) such as a RSS protocol request (or response) and a URL protocol request (or response) transmitted from the second and fourth network terminal device respectively, the user agents package the access protocol request (or response) into the SIP packet for executing a data access via the Internet.

Another objective of the present invention is to apply the method of the invention to a network system, and the network system comprises at least two private networks and an Internet, wherein each private network includes at least two network terminal devices (such as a computer with a network interface, a webcam, an Internet telephone, a web disk and a network printer, etc), wherein at least one network terminal device installs a user agent, and each network terminal device is connected to the Internet through a network connecting device (such as a network switch). In the method, the user agents of two different private networks issue a discovery protocol request to other network terminal devices of the respective private networks respectively. After a response returned by the other network terminal device has been received, each other network terminal device is registered as a selectable device of each user agent. When the user agent of the first private network issues a SIP packet to the user agent of the second private network, the selectable device is packaged into the SIP packet. After the user agent of the second private network has received the SIP packet, the user agent of the second private network reads the data of the selectable device in the SIP packet and packages the selectable device of the user agent of the second private network into another SIP packet and returns the other SIP packet to the user agent of the first private network via the Internet, so that the other network terminal devices of the two private networks can establish a connection channel between the two private networks through each user agent via the Internet. Each user agent issues an access protocol request such as a RSS protocol request and a URL protocol request to the corresponding other network terminal device. After a response returned from the corresponding other network terminal device has been received, a RTP streaming transmission is performed to execute a data access between the user agents of the two private networks via the Internet.

To make it easier for our examiner to understand the shape, structure, design principle and performance of the present invention, we use preferred embodiments together with the attached drawings for the detailed description of the invention as follows:

DETAILED DESCRIPTION OF THE PREFERRED EMBODIMENTS

Session initiation protocol (SIP) is a protocol of a communication standard developed by the IETF MMUSIC task force for creating, modifying and terminating various different interactive user sessions, and the interactive user sessions include multimedia interactive sessions such as video frequency, voice, instant messaging and online game, etc. Like the H.323a, the SIP is used as a main signaling protocol of VoIP, and the objective of the SIP design is to provide an extended set similar to the calling and processing functions of a public switched telephone network (PSTN) for implementing the operations such as dialing, ring, ringback tone or busy tone used in a common telephone, with the exceptions of different implementations and terminologies. In general, the SIP is a node-to-node protocol that requires a relatively simple core network to release the processing work to a smart node connected to a network edge (such as a network terminal device with installed hardware or software), so that many SIP functions can be achieved at the node. This arrangement is very similar to a traditional public switched telephone network that completes a processing work at its core network equipment. The SIP has a feature of implanting its root into the IP network system, so that the SIP can operate with many other protocols and solve problems related to the signaling portion of the communication session. A session description protocol (SDP) in the SIP is provided for describing a streaming detail used by a session, including which IP port is used or which encoder/decoder is used. The RTP is the actual carrier of a voice or video media streaming. Although the RTP cannot pass through a NAT router in a simple manner, most SIP clients can pass through a STUN protocol or a NAT router, or use a RTP proxy server to pass through an old-fashioned NAT router that cannot be recognized by the SIP.

Figure 1:
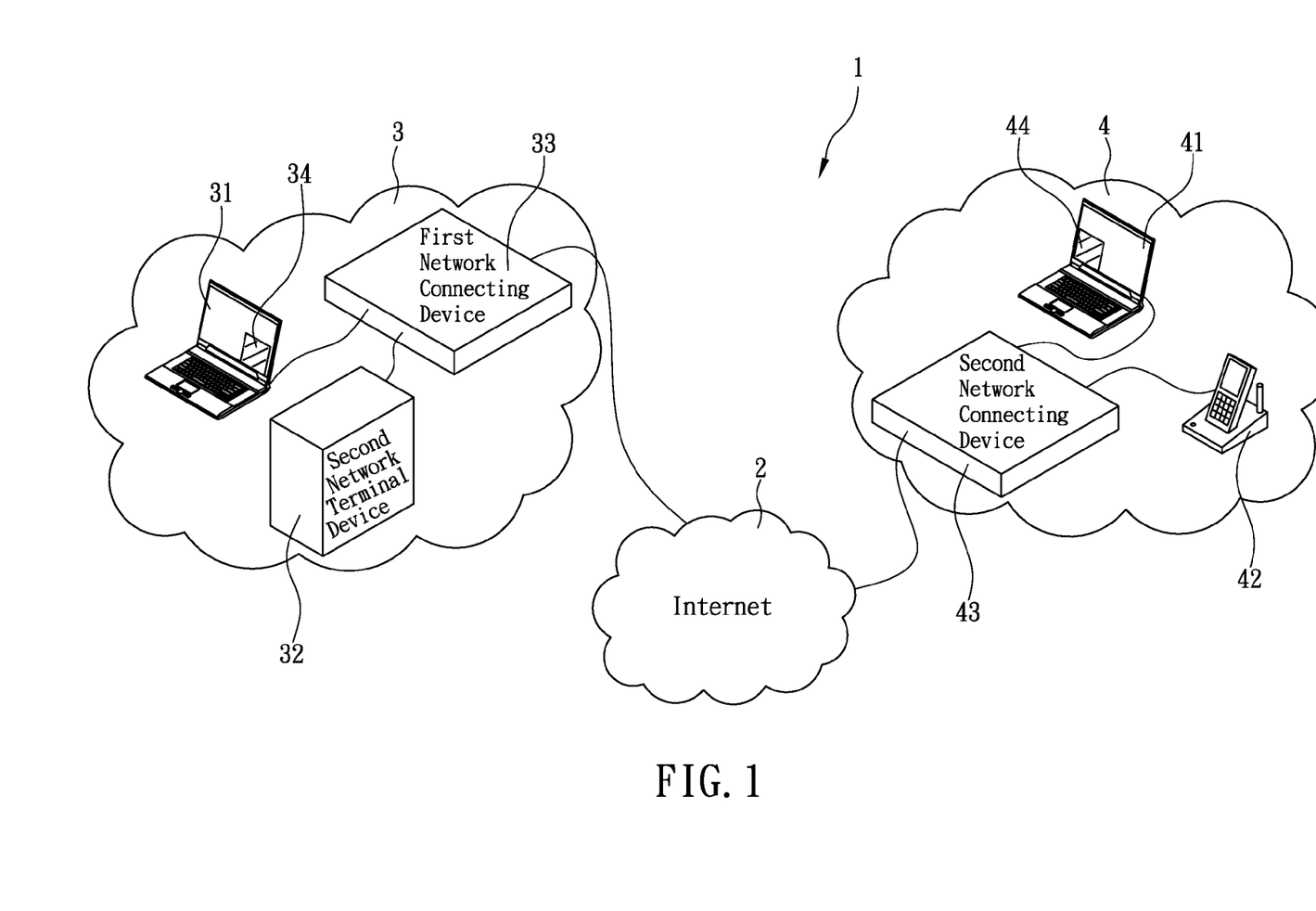
FIG. 1 shows a schematic view of a network system structure in accordance with the present invention.
Figure 2:
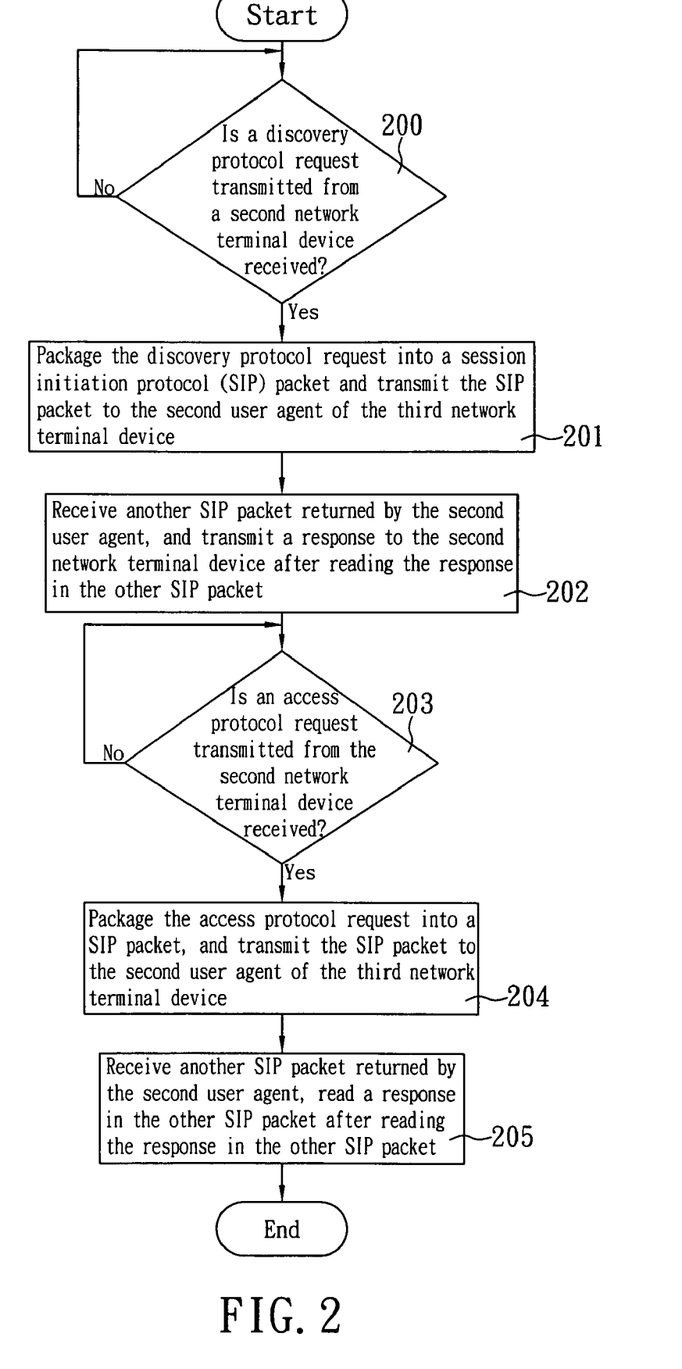
FIG. 2 shows a flow chart of a first preferred embodiment of the present invention.

Based on the aforementioned operating principle of the SIP protocol, the present invention provides a method of connecting and sharing resources of network terminal devices of two private networks via user agents, such that the network terminal devices on the two private networks can use the SIP protocol through the user agent of their respective private networks to establish a connection channel for accessing data with each other via the Internet. Referring to FIG. 1 for a method of the invention applied to a network system 1, the network system 1 comprises an Internet 2 and at least two private networks. In the first preferred embodiment of the present invention, a first private network 3 and a second private network 4 are used as examples for the illustration of the invention, and each private network 3, 4 comprises at least two network terminal devices (such as a computer with a network interface, a webcam, an Internet telephone, a web disk and a network printer, etc). In the first preferred embodiment, the first private network 3 includes a set of first network terminal device 31 (such as a computer with a network interface) and a set of second network terminal device 32 (such as a web disk), and the second private network 4 includes a set of third network terminal device 41 (such as a computer with a network interface) and a set of fourth network terminal device 42 (such as an Internet telephone), but other embodiments of the present invention are not limited to such arrangements only. Each private network can have at least two network terminal devices, and each network terminal device 31, 32, 41, 42 is connected to the Internet 2 through a set of first network connecting device 33 (such as a network switch) and a set of second network connecting device (such as a network switch) 43. In the method, the first network terminal device 31 and third network terminal device 41 install a first user agent (UA) 34 and a second user agent 44 of each private network 3, 4 respectively, so that the first user agent 34 of the first network terminal device 31 can be connected with the second network terminal device 32 of the first private network 3 for accessing data, and also can establish a connection channel with the third network terminal device 41 of the second private network 4 for sharing services provided by the second network terminal device 32 via the Internet 2. In the first preferred embodiment, each user agent 34, 44 processes according to the following procedure as shown in FIG. 2. Since each user agent 34, 44 executes the same procedure, only the first user agent 34 installed on the first network terminal device 31 of the first private network 3 is illustrated for simplicity as follows:

Step (200): Determine whether or not a discovery protocol request such as a UPnP AV or WS-discovery protocol request transmitted from the second network terminal device 32 is received; if yes, then go to Step (201), or else return to Step (200).

Step (201): Package the discovery protocol request into a session initiation protocol (SIP) packet, and transmit the SIP packet to the second user agent 44 of the third network terminal device 41 via the Internet 2. After the second user agent 44 has received the SIP packet, the second user agent 44 reads the discovery protocol request in the SIP packet, and transmits the discovery protocol request to the corresponding fourth network terminal device 42. After the second user agent 44 has received the response of discovery protocol returned by the fourth network terminal device 42, the second user agent 44 packages the response into another SIP packet and returns the other SIP packet to the first user agent 34 of the first network terminal device 31 via the Internet.

Step (202): After the first user agent 34 has received the other SIP packet returned by the second user agent 44, the first user agent 34 reads the response in the other SIP packet and transmits the response to the second network terminal device 32, so that before the aforementioned discovery phase is completed, the second network terminal device 32 can use the first user agent 34 of the first network terminal device 31 to discover and recognize the fourth network terminal device 42 through the Internet 2, and then can use the second user agent 44 of the third network terminal device 41 to discover and identify each other for establishing a connection channel, such that the second network terminal device 32 and the fourth network terminal device 42 can enter into an access phase with each other through the first user agent 34 and the second user agent 44.

Step (203): Determine whether or not an access protocol request such as a RSS or URL protocol request transmitted from the second network terminal device 32 is received; if yes, then go to Step (204), or else return to Step (203).

Step (204): Package the access protocol request into a SIP packet, and transmit the SIP packet to the second user agent 44 of the third network terminal device 41 via the Internet 2. After the second user agent 44 has received the SIP packet, the second user agent 44 reads the access protocol request in the SIP packet and transmits the access protocol request to the corresponding fourth network terminal device 42, such that the fourth network terminal device 42 can provide services according to the access protocol request. After the second user agent 44 has received a response of the access protocol returned by the fourth network terminal device 42, the second user agent 44 packages the response into another SIP packet and returns the other SIP packet to the first user agent 34 of the first network terminal device 31 via the Internet.

Step (205): After the first user agent 34 has received the other SIP packet returned by the second user agent 44, the first user agent 34 reads the response in the other SIP packet and transmits the response to the corresponding second network terminal device 32, so that the network terminal devices 32, 42 of the two different private networks 3, 4 can transmit an access protocol request or response to execute a data access or provides related services to each other through the corresponding user agent 34, 44 via the Internet.

Figure 3:
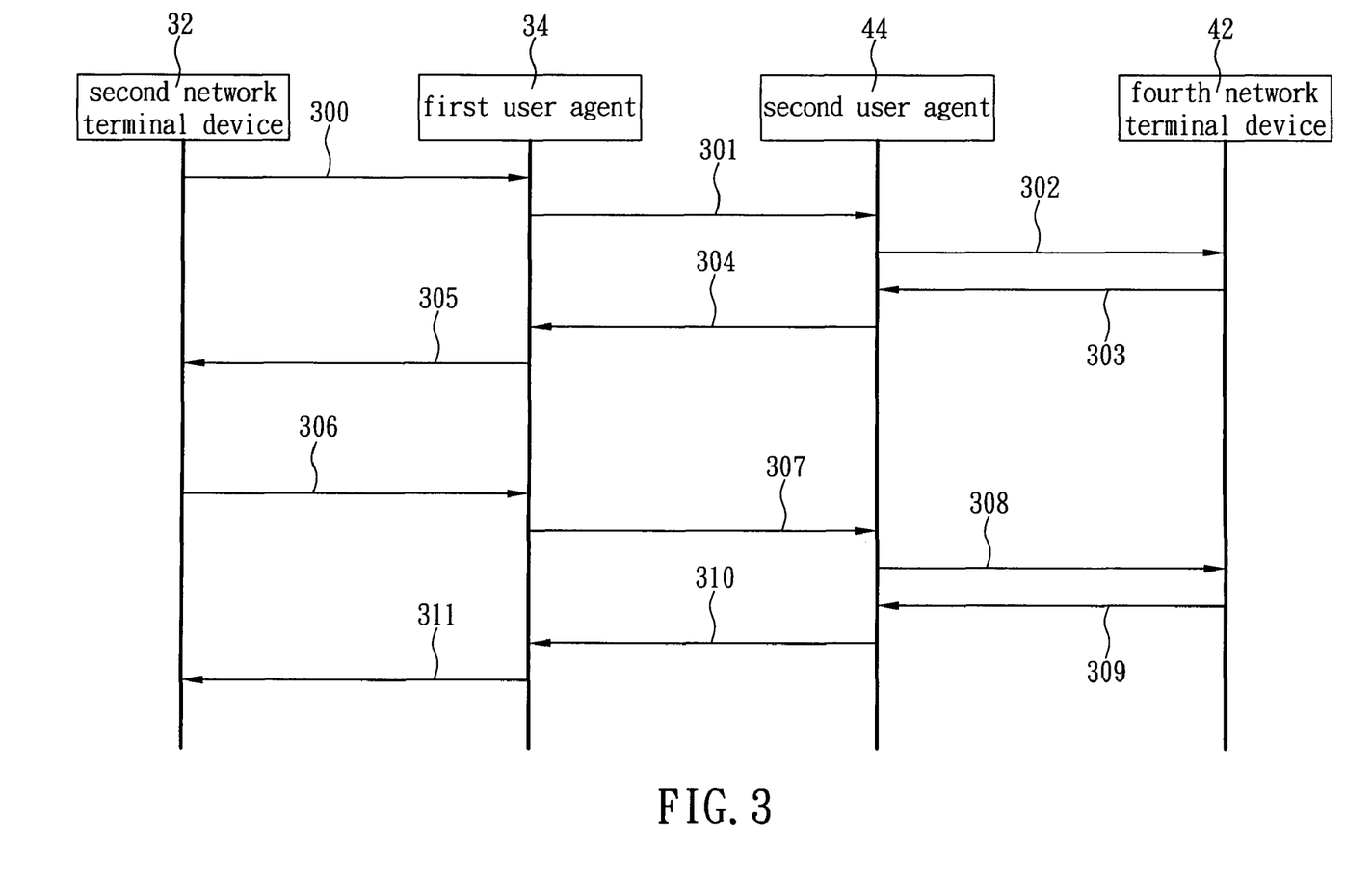
FIG. 3 shows a timing diagram of a first network terminal device and a third network terminal device in accordance with a first preferred embodiment of the present invention to establish a connection channel according to the flow chart as depicted in FIG. 2.

In the first preferred embodiment as shown in FIG. 1, if the second network terminal device 32 and the fourth network terminal device 42 are a web disk and an internet telephone respectively, then a connection channel will be established between the second network terminal device 32 and the fourth network terminal device 42 according to the procedure described above, and the second network terminal device 32 and the fourth network terminal device 42 are connected to the Internet through the first network terminal device 31 and the third network terminal device 41 for executing a data access via the Internet. The timing diagram of establishing the connection channel as shown in FIG. 3 is described in details as follows:

Step (300): The second network terminal device 32 issues a discovery protocol request such as a UPnP AV or WS-discovery protocol request to the first user agent 34 of the first network terminal device 31.

Step (301): After the first user agent 34 has received the discovery protocol request, the first user agent 34 packages the discovery protocol request into a SIP packet and transmits the SIP packet to the second user agent 44 of the third network terminal device 41 via the Internet 2.

Step (302): After the second user agent 44 has received the SIP packet transmitted from the first user agent 34, the second user agent 44 reads the discovery protocol request in the SIP packet and transmits the discovery protocol request to the fourth network terminal device 42.

Step (303): After the fourth network terminal device 42 has received the discovery protocol request, the fourth network terminal device 42 issues a response to the second user agent 44.

Step (304): After the second user agent 44 has received the response transmitted from the fourth network terminal device 42, the second user agent 44 packages the response into another SIP packet and transmits the other SIP packet to the first user agent 34 via the Internet 2.

Step (305): After the first user agent 34 has received the other SIP packet transmitted from the second user agent 44, the first user agent 34 reads the response in the other SIP packet and transmits the response to the second network terminal device 32 to complete the discovery phase, so that the second network terminal device 32 and the fourth network terminal device 42 can discover and recognize each other through the first user agent 34 and the second user agent 44 and establish a connection channel for entering into an access phase between the second network terminal device 32 and the fourth network terminal device 42.

Step (306): The second network terminal device 32 issues an access protocol request such as a RSS or URL protocol request to the first user agent 34 of the first network terminal device 31.

Step (307): After the first user agent 34 has received the access protocol request, the first user agent 34 packages the access protocol request into a SIP packet and transmits the SIP packet to the second user agent 44 of the third network terminal device 41 via the Internet 2.

Step (308): After the second user agent 44 has received the SIP packet transmitted from the first user agent 34, the second user agent 44 reads the access protocol request in the SIP packet and transmits the access protocol request to the fourth network terminal device 42.

Step (309): After the fourth network terminal device 42 has received the access protocol request, the fourth network terminal device 42 issues a response to the second user agent 44.

Step (310): After the second user agent 44 has received the response transmitted from the fourth network terminal device 42, the second user agent 44 packages the response into another SIP packet, and transmits the SIP packet to the first user agent 34 via the Internet 2.

Step (311): After the first user agent 34 has received the SIP packet transmitted from the second user agent 44, the first user agent 34 reads the response in the other SIP packet and transmits the response to the second network terminal device 32, so that the second network terminal device 32 and the fourth network terminal device 42 can execute a data access via the Internet or provide related services through the connection channel.

Now, the second user agent 44 can use the fourth network terminal device 42 (which is an Internet telephone) to dial an Internet telephone call and transmit the conversation content of the fourth network terminal device 42 to the second network terminal device 32 (such as a web disk) for storage, so that each network terminal device on the two private networks can establish a connection channel to share the services provided by the corresponding network terminal devices via the Internet. It is noteworthy to point out that the discovery protocol request or the access protocol request issued by the second network terminal device 32 in the first preferred embodiment must be packaged into a SIP packet by the first user agent 34 first and then transmitted to the second user agent 44 via the Internet 2. The second user agent 44 reads the discovery protocol request or the access protocol request in the SIP packet and transmits the discovery protocol request or the access protocol request to the fourth network terminal device 42. Therefore, the second network terminal device 32 and the fourth network terminal device 42 must install the same discovery protocol and access protocol, or else they cannot recognize the request transmitted from the opposite party, nor generate the corresponding response.

Figure 4:
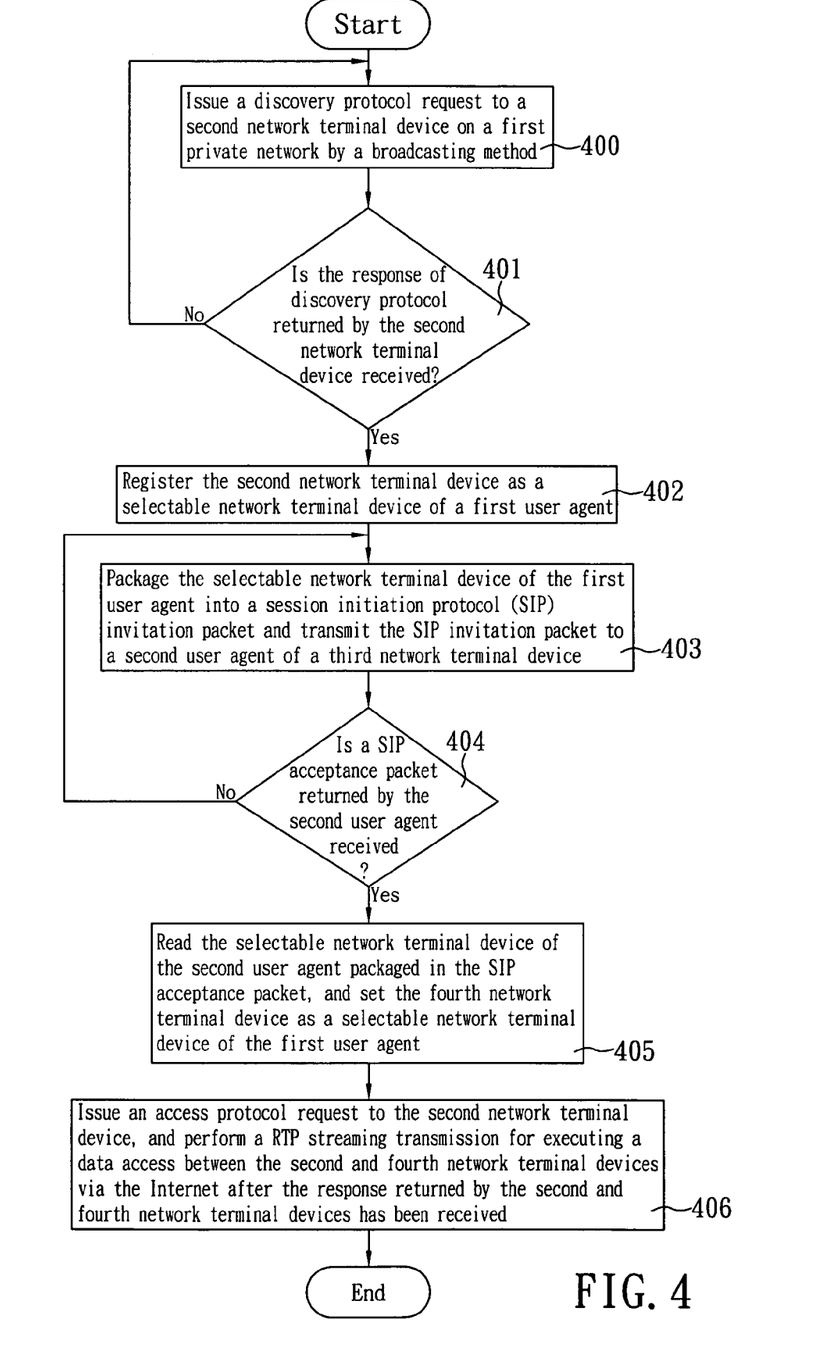
FIG. 4 shows a flow chart of a second preferred embodiment of the present invention.

In a second preferred embodiment of the present invention as shown in FIG. 1, the second network terminal device 32 and the fourth network terminal device 42 do not require the same discovery protocol and access protocol, but each user agent 34, 44 still can establish a connection channel between the two user agents 34, 44 according to the following procedure as shown in FIG. 4, so that each network terminal device on the two private networks can share the services provided by the corresponding network terminal device via the Internet. In the second preferred embodiment, each user agent 34, 44 executes the same procedure, only the first user agent 34 installed on the first network terminal device 31 on the first private network 3 is used for the illustration for simplicity as follows:

Step (400): Issue a discovery protocol request such as a PnP AV or WS-Discovery protocol request to the second network terminal device 32 on the first private network 3 by a broadcasting method.

Step (401): Determine whether or not the response of discovery protocol returned by the second network terminal device 32 is received; if yes, then go to Step (402), or else return to Step (400).

Step (402): Register the second network terminal device 32 as a selectable network terminal device of the first user agent 34.

Step (403): Package the selectable network terminal device of the first user agent 34 into a session initiation protocol (SIP) invitation packet and transmit the SIP invitation packet to the second user agent 44 of the third network terminal device 41 via the Internet 2. After the second user agent 44 has received the SIP invitation packet, the second user agent 44 reads the selectable network terminal device of the first user agent 34 in the SIP invitation packet.

Step (404): Determine whether or not a SIP acceptance packet returned by the second user agent 44 is received; if yes, then go to Step (405), or else return to Step (403).

Step (405): Read the selectable network terminal device of the second user agent 44 packaged in the SIP acceptance packet, and set the fourth network terminal device 42 as the selectable network terminal device of the first user agent 34 to complete the discovery phase, so that the first user agent 34 and the second user agent 44 can discover and recognize the selectable network terminal devices with each other and establish a connection channel between the first user agent 34 and the second user agent 44 for entering into an access phase with each other.

Step (406): The first and second user agents 34, 44 of the first and third network terminal devices 31, 41 issue an access protocol request to the corresponding second and fourth network terminal devices 32, 42 on the private network 3, 4 respectively. After the response returned by the second and fourth network terminal devices 32, 42 has been received, a RTP streaming transmission for executing a data access is performed between the user agents 34, 44 of the two private networks 3, 4 to transmit data between the network terminal devices 32, 42 via the Internet.

Figure 5:
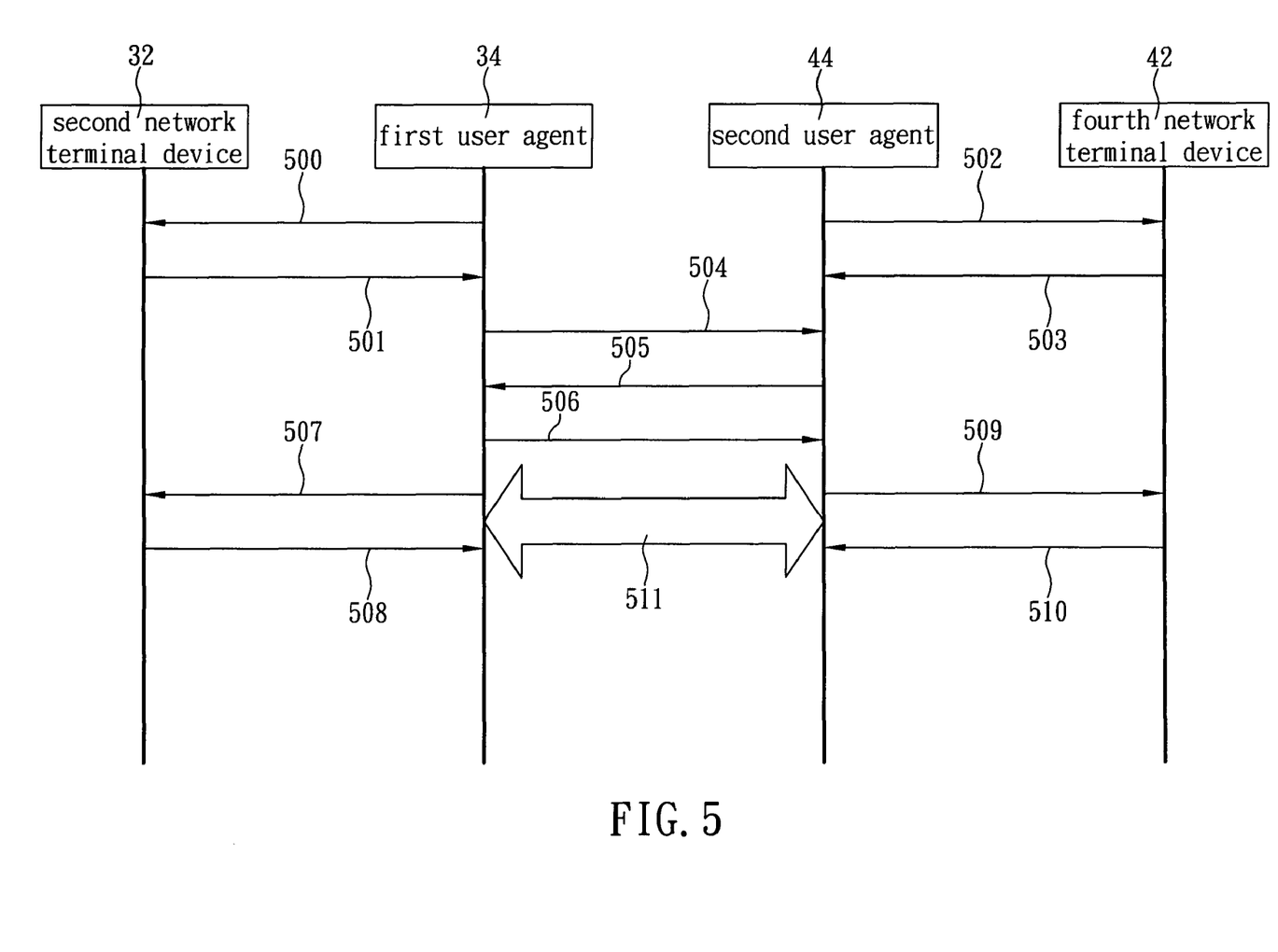
FIG. 5 shows a timing diagram of a second network terminal device and a fourth network terminal device in accordance with a second preferred embodiment of the present invention to establish a connection channel according to the flow chart as depicted in FIG. 2.

In the second preferred embodiment as shown in FIG. 1, if the second network terminal device 32 and the fourth network terminal device 42 are a web disk and an internet telephone respectively, and the second network terminal device 32 and the fourth network terminal device 42 are connected with the Internet 2 through the first network terminal device 31 and the third network terminal device 41 respectively. Now, a connection channel is established between the first user agent 34 and the second user agent 44 according to the aforementioned procedure for transmitting data with each other. The timing diagram of establishing the connection channel as shown in FIG. 5 is illustrated in details as follows:

Step (500): The first user agent 34 issues a discovery protocol request such as a UPnP AV or WS-discovery protocol request to the second network terminal device 32.

Step (501): After the second network terminal device 32 has received the discovery protocol request, the second network terminal device 32 issues a response to the first user agent 34. After the first user agent 34 has received the response, the first user agent 34 registers the second network terminal device 32 as a selectable network terminal device of the first user agent 34.

Step (502): In the meanwhile, the second user agent 44 also issues a discovery protocol request such as a UPnP AV or WS-Discovery protocol request to the fourth network terminal device 42.

Step (503): After the fourth network terminal device 42 has received the discovery protocol request, the fourth network terminal device 42 issues a response to the second user agent 44. After the second user agent 44 has received the response, the second user agent 44 registers the fourth network terminal device 42 as a selectable network terminal device of the second user agent 44.

Step (504): The first user agent 34 packages the selectable network terminal device 32 into a session initiation protocol (SIP) invitation packet, and transmits the SIP invitation packet to the second user agent 44 of the third network terminal device 41 via the Internet 2.

Step (505): After the second user agent 44 has received the SIP invitation packet, the second user agent 44 reads the selectable network terminal device of the first user agent 34 in the SIP invitation packet, and registers the second network terminal device 32 as a selectable network terminal device of the second user agent 44. In the meantime, the second user agent 44 packages the selectable fourth network terminal device 42 into a SIP acceptance packet and transmits the SIP acceptance packet to the first user agent 34 via the Internet 2.

Step (506): After the first user agent 34 has received the SIP acceptance packet, the first user agent 34 reads the selectable fourth network terminal device 42 of the second user agent 44 packaged in the SIP acceptance packet, and registers the fourth network terminal device 42 as a selectable network terminal device of the first user agent 34. In the meantime, the first user agent 34 produces an acknowledge packet, and transmits the acknowledge packet to the second user agent 44 via the Internet 2 to complete a discovery phase, so that the first user agent 34 and the second user agent 44 can discover and recognize the selectable network terminal devices with each other, and establish a connection channel for entering into an access phase with each other.

Step (507): The first user agent 34 issues an access protocol request such as a RSS or URL protocol request to the second network terminal device 32.

Step (508): After the second network terminal device 32 has received the access protocol request, the second network terminal device 32 issues a response to the first user agent 34.

Step (509): In the meantime, the second user agent 44 issues an access protocol request such as a RSS or URL protocol request to the fourth network terminal device 42.

Step (510): After the fourth network terminal device 42 has received the access protocol request, the fourth network terminal device 42 issues a response to the second user agent 44.

Step (511): The two user agents 34, 44 perform a RTP streaming transmission to execute a data access or provide related services for transmitting data between the network terminal devices 32, 42 via the Internet.

Now, the second user agent 44 can select the fourth network terminal device 42 (which is an Internet telephone) to dial an Internet telephone call, and transmit the conversation content of the fourth network terminal device 42 to the second network terminal device 32 (which is a web disk) for recording and storing the conversation content. Thus, a connection channel is established between the network terminal devices on the two private networks to share the services provided by the respective network terminal devices via the Internet.

While the invention has been described by means of specific embodiments, numerous modifications and variations could be made thereto by those skilled in the art without departing from the scope and spirit of the invention set forth in the claims.

What is claimed is:

1. A method of connecting and sharing resources of network terminal devices of two private networks via user agents, and the method being applied in a network system, and the network system comprising at least two private networks and an Internet, wherein each private network includes at least two network terminal devices, and at least one network terminal device installs a user agent, and each user agent is connected with the other network terminal device on a respective private network, and each network terminal device is connected to the Internet through a network connecting device, and the method comprising:

a first user agent of a first network terminal device on a first private network packaging a discovery protocol request into a first session initiation protocol packet and transmitting the first session initiation protocol packet to a second user agent of a third network terminal device on a second private network via the Internet, after the first user agent of the first network terminal device receives the discovery protocol request transmitted from a second network terminal device on the first private network;

the second user agent of the third network terminal device reading the discovery protocol request in the first session initiation protocol packet and transmitting the discovery protocol request to a fourth network terminal device on the second private network, after the second user agent of the third network terminal device receives the first session initiation protocol packet;

the second user agent of the third network terminal device packaging a first response of accepting the discovery protocol request transmitted from the fourth network terminal device into a second session initiation protocol packet and transmitting the second session initiation protocol packet to the first user agent of the first network terminal device via the Internet, after the second user agent of the third network terminal device receives the first response of accepting the discovery protocol request returned by the fourth network terminal device; and the first user agent of the first network terminal device reading the first response in the second session initiation protocol packet and transmitting the first response to the second network terminal device, after the first user agent of the first network terminal device receives the second session initiation protocol packet, such that the second network terminal device and the fourth network terminal device can use the first user agent and the second user agent to discover and identify with each other via the Internet, and establish a connection channel for an online connection.

2. The method of claim 1, further comprising:

the second network terminal device of the first private network issuing an access protocol request to the first user agent corresponding to the second network terminal device;

the first user agent packaging the access protocol request into a third session initiation protocol packet after the first user agent receives the access protocol request, and transmitting the third session initiation protocol packet to the second user agent of the second private network via the Internet;

the second user agent reading the access protocol request in the third session initiation protocol packet after the second user agent receives the third session initiation protocol packet, and transmitting the access protocol request to the fourth network terminal device;

the fourth network terminal device issuing a second response to the second user agent corresponding to the fourth network terminal device, after the fourth network terminal device receives the access protocol request and acknowledges the access protocol request;

the second user agent packaging the second response into a fourth session initiation protocol packet after the second user agent receives the second response, and returning the second response to the first user agent via the Internet; and the first user agent reading the second response in the fourth session initiation protocol packet, after the first user agent receives the fourth session initiation protocol packet, and transmitting the second response to the second network terminal device, such that the second network terminal device and the fourth network terminal device on the two different private networks can use the corresponding first and second user agents to transmit a request or a response of the access protocol to execute a data access or provide a related service via the Internet.

3. The method of claim 2, wherein the discovery protocol is a UPnP (Universal Plug and Play) AV (Audio and Video) protocol.

4. The method of claim 2, wherein the discovery protocol is a WS-Discovery (Web Services Dynamic Discovery) protocol.

5. The method of claim 2, wherein the access protocol is a RSS (Really Simple Syndication) protocol.

6. The method of claim 2, wherein the access protocol is a URL (Uniform Resource Locator) protocol.

7. A method of connecting and sharing resources of network terminal devices on two private networks via user agents, and the method being applied to a network system, and the network system comprising at least two private networks and an Internet, wherein each private network includes at least two network terminal devices, and at least one network terminal device installs a user agent, and each user agent is connected to the other network terminal device on a respective private network, and each network terminal device is connected to the Internet through a network connecting device, and the method comprising:

a first user agent of a first network terminal device on a first private network issuing a first discovery protocol request to a second network terminal device on the first private network;

the second network terminal device issuing a first response to the first user agent, after the second network terminal device receives the first discovery protocol request and acknowledges the first discovery protocol request;

the first user agent registering information of the second network terminal device as a network terminal device selected by the first user agent, after the first user agent receives the first response;

a second user agent of a third network terminal device on a second private network issuing a second discovery protocol request to a fourth network terminal device on the second private network;

the fourth network terminal device issuing a second response to the second user agent, after the fourth network terminal device receives the second discovery protocol request and acknowledges the second discovery protocol request;

the second user agent registering information of the fourth network terminal device as a network terminal device selected by the second user agent, after the second user agent receives the second response;

the first user agent packaging information of the network terminal device selected by the first user agent into an invitation packet of a first session initiation protocol, and transmitting the invitation packet to the second user agent;

the second user agent reading the information of the network terminal device selected by the first user agent and packaged in the invitation packet of the first session initiation protocol after the second user agent receives the invitation packet of the first session initiation protocol, and packaging information of the network terminal device selected by the second user agent into an acceptance packet of the first session initiation protocol, and transmitting the acceptance packet to the first user agent via the Internet; and the first user agent reading the information of the network terminal device selected by the second user agent packaged in the acceptance packet of the first session initiation protocol, after the first user agent receives the acceptance packet of the first session initiation protocol, such that the first user agent and the second user agent discover and identify the network terminal devices selected by each other, and a connection channel is established between the first user agent and the second user agent for an online connection.

8. The method of claim 7, further comprising:

the first user agent of the first private network issuing a first access protocol request to the second network terminal device;

the second network terminal device issuing a third response to the first user agent corresponding to the second network terminal device, after the second network terminal device receives the first access protocol request and acknowledges the first access protocol request;

the second user agent of the second private network issuing a second access protocol request to the fourth network terminal device corresponding to the second user agent;

the fourth network terminal device issuing a fourth response to the second user agent corresponding to the fourth network terminal device, after the fourth network terminal device receives the second access protocol request and acknowledges the second access protocol request; and the first user agent and the second user agent performing a RTP (Real-time Transport Protocol) streaming transmission to execute data access for a data transmitted between the second network terminal device and the fourth network terminal device via the Internet, after the first user agent and the second user agent receive the third response and the fourth response respectively.

9. The method of claim 8, wherein the discovery protocol is a UPnP (Universal Plug and Play) AV (Audio and Video) protocol.

10. The method of claim 8, wherein the discovery protocol is a WS-Discovery (Web Services Dynamic Discovery) protocol.

11. The method of claim 8, wherein the access protocol is a RSS (Really Simple Syndication) protocol.

12. The method of claim 8, wherein the access protocol is a URL (Uniform Resource Locator) protocol.

* * * * *